United States Patent
Chen

(10) Patent No.: US 7,251,283 B2
(45) Date of Patent: Jul. 31, 2007

(54) TIMING OFFSET COMPENSATION IN ORTHOGONAL FREQUENCY DIVISION MULTIPLEXING SYSTEMS

(75) Inventor: Hung-Kun Chen, Hsinchu (TW)

(73) Assignee: Mediatek, Inc., Hsin-Chu (TW)

( * ) Notice: Subject to any disclaimer, the term of this patent is extended or adjusted under 35 U.S.C. 154(b) by 751 days.

(21) Appl. No.: 10/689,424

(22) Filed: Oct. 20, 2003

(65) Prior Publication Data

US 2005/0084025 A1    Apr. 21, 2005

(51) Int. Cl.
  *H04K 1/10* (2006.01)
(52) U.S. Cl. .................. 375/260; 375/341; 375/267
(58) Field of Classification Search .............. 375/232, 375/350, 260, 344, 326, 327, 261; 455/182.2, 455/182.3, 183.1, 183.2
See application file for complete search history.

(56) References Cited

U.S. PATENT DOCUMENTS

2002/0145971 A1* 10/2002 Cho et al. .................. 370/208
2005/0058193 A1* 3/2005 Saed .......................... 375/232

* cited by examiner

*Primary Examiner*—Chieh M. Fan
*Assistant Examiner*—Julia P Tu
(74) *Attorney, Agent, or Firm*—Thomas, Kayden, Horstemeyer & Risley

(57) ABSTRACT

A robust timing offset compensation scheme for multi-carrier systems. According to the invention, a timing offset compensator is provided to compensate a current symbol in the frequency domain for the effect of timing offset with a timing offset prediction value. Then a timing error estimator calculates a timing error value for the current symbol based on a function of a phase tracking value, a channel response of each pilot subcarrier, transmitted data on each pilot subcarrier, and a timing compensated version of the current symbol on the pilot subcarrier locations. Furthermore, a timing tracking unit receives the timing error value of the current symbol to generate a shift amount of the DFT window and the timing offset prediction value for a next symbol.

20 Claims, 3 Drawing Sheets

TIMING OFFSET COMPENSATION IN ORTHOGONAL FREQUENCY DIVISION MULTIPLEXING SYSTEMS

BACKGROUND OF THE INVENTION

1. Field of the Invention

The invention relates to digital communication systems, and more particularly to a robust timing offset compensation scheme for Orthogonal Frequency Division Multiplexing (OFDM) systems.

2. Description of the Related Art

With the rapidly growing demand for cellular, mobile radio and other wireless transmission services, there has been an increasing interest in exploiting various technologies to provide reliable, secure, and efficient wireless communications. Orthogonal Frequency Division Multiplexing (OFDM) is well known as a highly spectral efficient transmission scheme capable of dealing with severe channel impairment encountered in a mobile environment. OFDM was previously adopted for wireless local area network (WLAN) applications as part of the IEEE 802.11a standard in the 5 GHz frequency band. Furthermore, the IEEE 802.11 g standard approved in June of 2003 also adopted OFDM as a mandatory part for a further high-speed physical layer (PHY) extension to the 802.11b standard in the 2.4 GHz band.

The basic idea of OFDM is to divide the available spectrum into several sub-channels (subcarriers). By making all sub-channels narrowband, they experience almost flat fading, which makes equalization very simple. In order to obtain a high spectral efficiency, the frequency responses of the sub-channels are overlapping and orthogonal. This orthogonality can be completely maintained by introducing a guard interval, even though the signal passes through a time-dispersive channel. A guard interval (GI) is a copy of the last part of an OFDM symbol which is pre-appended to the transmitted symbol. This plays a decisive role in avoiding inter-symbol and inter-carrier interference.

OFDM can largely eliminate the effects of inter-symbol interference (ISI) for high-speed transmission in highly dispersive channels by separating a single high speed bit stream into a multiplicity of much lower speed bit streams each modulating a different subcarrier. However, OFDM is known to be vulnerable to synchronization errors due to the narrow spacing between subcarriers. The most important difficulty when implementing OFDM systems is that of achieving timing, phase and frequency synchronization between the transmitter and the receiver. In general, mismatch between transmitter and receiver oscillators contributes a non-zero carrier frequency offset in a received OFDM signal. Transient behavior of the frequency synthesizer is another source of the frequency offset. OFDM signals are very susceptible to the frequency offset which causes a loss of orthogonality between the OFDM subcarriers and results in inter-carrier interference (ICI) and bit error rate (BER) deterioration of the receiver. Similarly, phase noise arising from oscillators also introduces ICI. In addition, both frequency offset and phase noise cause phase variation so that phase tracking is required for coherent detection. Unlike the frequency offset and phase noise, as stated above, timing errors may incur inter-symbol interference (ISI) in addition to ICI. If the exact timing of the beginning of each symbol is not known, the receiver cannot be reliably removed the guard interval and correctly acquire individual symbols before computing the Fast Fourier Transform (FFT) of their samples. In this case, inter-symbol interference occurs. Moreover, even a small time-domain misalignment of the FFT window results in an evolving phase shift in the frequency-domain symbols, leading to BER degradation. Yet another concern issue is the difference between the sampling rate of the receiver and that of the transmitter. This sampling rate offset results in a rotation of the $2^m$-ary constellation from symbol to symbol.

Many techniques dealing with the frequency offset estimation have been previously proposed for OFDM systems. Nevertheless, fewer works lend themselves readily to timing and phase compensation suitable for integrated circuit implementation. In order to achieve rapid acquisition and accurate tracking, there is a need to particularly address the timing offset in the lock transient of local oscillators.

SUMMARY OF THE INVENTION

It is an object of the present invention to provide a timing estimation apparatus for multi-carrier systems such as OFDM receivers.

It is another object of the present invention to provide a timing tracking apparatus for rapidly acquiring and continuously tracking the timing of OFDM signals.

It is yet another object of the present invention to provide a robust timing offset compensation scheme for OFDM systems, which is well-suited to integrated circuit implementation.

The present invention is generally directed to a timing offset compensation apparatus for multi-carrier systems. According to one aspect of the invention, a timing error estimation apparatus for multi-carrier systems is disclosed. The timing error estimation apparatus includes a timing offset compensator and a timing error estimator. The timing offset compensator receives a current symbol in the frequency domain after taking an N-point Discrete Fourier Transform (DFT) and compensates the current symbol for the effect of timing offset with a timing offset prediction value. The timing error estimator is coupled to the timing offset compensator to take a timing compensated version of the current symbol on pilot subcarrier locations; it can calculate a timing error value based on a function of a phase tracking value, a channel response of each pilot subcarrier, transmitted data on each pilot subcarrier, and the timing compensated version of the current symbol on said pilot subcarrier locations.

According to another aspect of the invention, a timing tracking apparatus for multi-carrier systems is proposed. The timing tracking apparatus is constituted by a parameter table, an nth-order tracking loop and a timing synchronizer. The parameter table is configured to store a number of loop parameters. The nth-order tracking loop is adapted to compute a timing offset prediction value for a next symbol based on a timing error value of a current symbol, the timing offset prediction value of the current symbol and the loop parameters that are retrieved from the parameter table for the current symbol. According to the timing offset prediction value of the next symbol, the timing synchronizer generates a shift amount of the DFT window for the next symbol, in which the shift amount is equal to zero if the timing offset prediction value of the next symbol is within a predetermined range. Moreover, the timing synchronizer applies the DFT window shift amount to align the DFT window and further starts an inhibit interval if the shift amount is not equal to zero. Upon completion of the inhibit interval, the DFT window shift amount is further subtracted from the timing offset prediction value.

In a preferred embodiment of the invention, a timing offset compensation apparatus is composed of a timing offset compensator, a timing error estimator and a timing tracking unit. The timing offset compensator receives a current symbol in the frequency domain after taking an N-point Discrete Fourier Transform (DFT) and compensates the current symbol for the effect of timing offset with a timing offset prediction value. The timing error estimator is adapted to take a timing compensated version of the current symbol on pilot subcarrier locations; it calculates a timing error value for the current symbol based on a function of a phase tracking value, a channel response of each pilot subcarrier, transmitted data on each pilot subcarrier, and the timing compensated version of the current symbol on the pilot subcarrier locations. The timing tracking unit receives the timing error value of the current symbol to generate the timing offset prediction value and a shift amount of the DFT window for a next symbol.

DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

Figure 1:
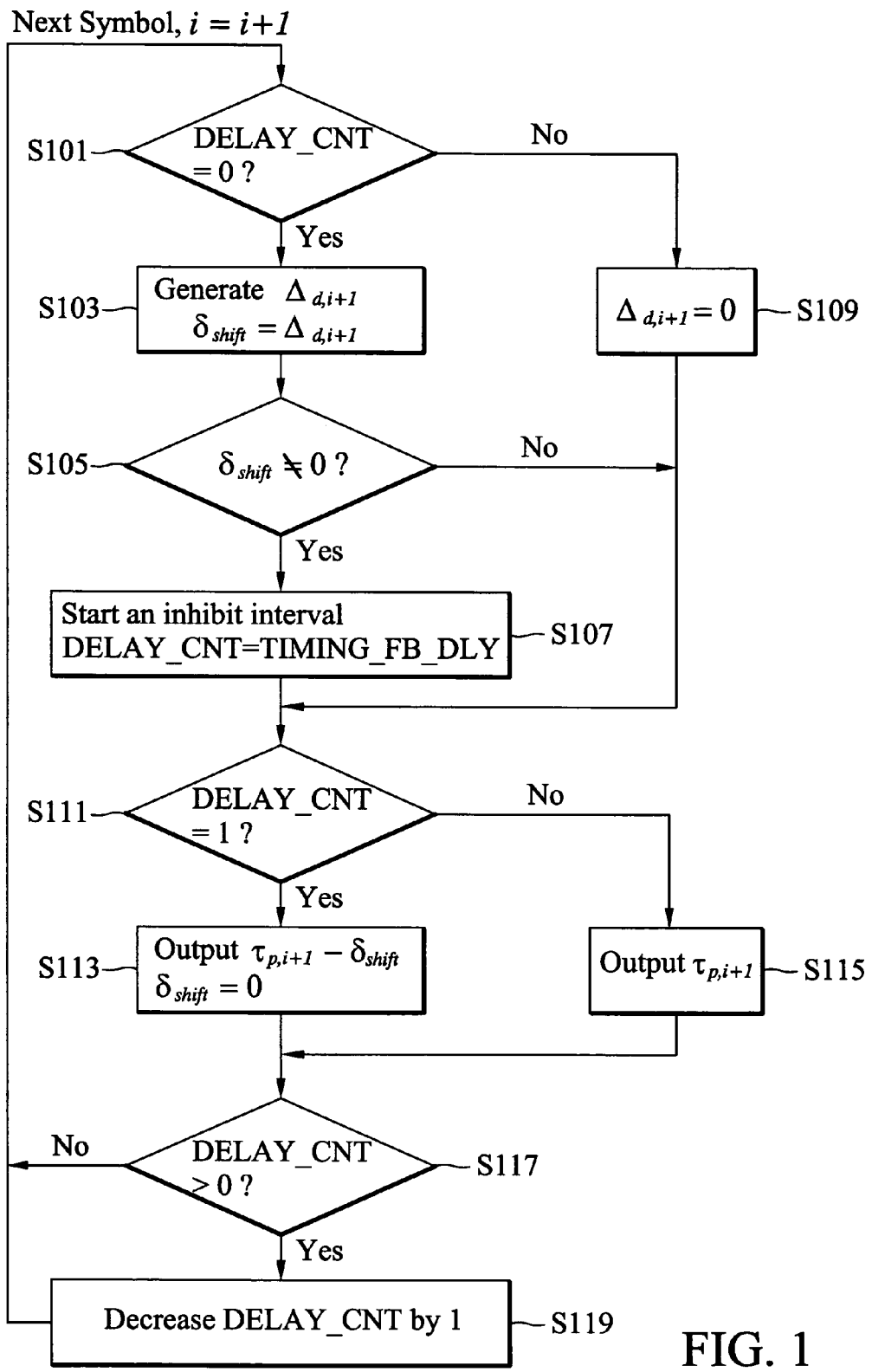
FIG. 1 is a flowchart illustrating primary steps of dealing with feedback delay from the timing offset tracking to the FFT (DFT) window alignment.

The present invention will now be described in the context of the use of OFDM for communication, although the present invention is not limited to OFDM. The present invention is also described with reference to a wireless communication system that conforms to the IEEE 802.11a/g standard. According to the invention, the communication system need not be wireless and the conformant 802.11a/g transceiver referred to herein is merely an exemplary illustration.

In a conformant 802.11a/g system, an OFDM symbol is modulated onto a number of subcarriers by applying an N-point Inverse Fast Fourier Transform (FFT) with N=64. At the receiving end, the demodulation can be accomplished by means of an N-point FFT. Ignoring the ICI noise term, the output of FFT is described by $$R_{i,k} = H_k X_{i,k} e^{j\phi_i} e^{-j2\pi \frac{k\Delta t_i}{T}} + N_{i,k} \quad (1)$$

and $$\phi_i = \Omega \cdot i + \phi_0, \quad \Omega = 2\pi f_\varepsilon T'$$

where
  i denotes the OFDM symbol index,
  k denotes the subcarrier index,
  $X_{i,k}$ is complex-valued data transmitted on subcarrier k of the ith OFDM symbol,
  $H_k$ is the channel response of subcarrier k,
  $N_{i,k}$ is the frequency-domain representation of additive white Gaussian noise (AWGN) at the kth subcarrier during the ith OFDM symbol,
  T is the FFT period,
  $\Delta t_i$ is the timing offset with respect to the FFT period during the ith OFDM symbol,
  T' is the symbol interval (including the GI duration),
  $f_\varepsilon$ is the residual frequency error due to the initial frequency offset estimation,
  $\phi_0$ is the initial phase drift, and
  $\phi_i$ is the equivalent phase offset of the ith OFDM symbol.

Note that the noise term, $N_{i,k}$, is iid (identically, independently distributed) over different symbols and subcarriers. From the above signal model, the phase and timing offsets both result in additional phase shifts. It is easily seen that the presence of timing offset causes a phase rotation proportional to the subcarrier index k and the timing offset $\Delta t_i$.

Denoting the pilot subcarrier index by $p_m$, the conditional joint probability density function of those pilot tones of the ith symbol given $\phi_i$, $\Delta t_i$, $H_k$ and $X_{i,k}$, for $k=p_m$, is given by:

$$g(R_{i,p_1}, R_{i,p_2}, \cdots, R_{i,p_{N_{SP}}} | \phi_i, \Delta t_i, H_k, X_{i,k}) = \left(\frac{1}{\sqrt{2\pi\sigma_N^2}}\right)^{N_{SP}} \exp\left(-\frac{1}{2\sigma_N^2}\sum_{m=1}^{N_{SP}} \left| R_{i,p_m} - H_{p_m} X_{i,p_m} e^{j\phi_i} e^{-j2\pi\frac{p_m \Delta t_i}{T}} \right|^2 \right)$$

where
  $\sigma_N^2$ denotes the noise variance per subcarrier and $\sigma_N^2 = E\{|N_{i,k}|^2\}$,
  $R_{i,p_m}$ denotes the ith received OFDM symbol on pilot subcarrier location $p_m$, and
  $N_{SP}$ is the number of pilot subcarriers.

Therefore, a pilot-aided estimation is derived from this function using the maximum-likelihood (ML) principle as follows:

$$\Delta \hat{t}_i = \arg\max_{\Delta t_i} g(R_{i,p_1}, R_{i,p_2}, \cdots, R_{i,p_{N_{SP}}} | \phi_i, \Delta t_i, H_k, X_{i,k})$$

$$= \arg\max_{\Delta t_i} \left(-\sum_{m=1}^{N_{SP}} \left| R_{i,p_m} - H_{p_m} X_{i,p_m} e^{j\phi_i} e^{-j2\pi\frac{p_m \Delta t_i}{T}} \right|^2 \right)$$

$$= \arg\max_{\Delta t_i} \sum_{m=1}^{N_{SP}} \left[ 2\text{Re}\left\{R_{i,p_m}\left(H_{p_m} X_{i,p_m} e^{j\phi_i} e^{-j2\pi\frac{p_m \Delta t_i}{T}}\right)^*\right\} - |R_{i,p_m}|^2 - |H_{p_m} X_{i,p_m}|^2 \right]$$

$$= \arg\max_{\Delta t_i} \sum_{m=1}^{N_{SP}} \text{Re}\left\{R_{i,p_m}\left(H_{p_m} X_{i,p_m} e^{j\phi_i} e^{-j2\pi\frac{p_m \Delta t_i}{T}}\right)^*\right\}$$

$$= \arg\max_{t} L(t)$$

where $$L(t) = \text{Re}\left\{\sum_{m=1}^{N_{SP}} R_{i,p_m}\left(H_{p_m} X_{i,p_m} e^{j\phi_i} e^{-j2\pi\frac{p_m t}{T}}\right)^*\right\}$$

Note that superscript * herein denotes complex conjugation. To find the maximum of L(t), the equation of $$\frac{dL(t)}{dt} = L'(t) = 0$$

must be solved first. However, the derivative L'(t) can be shown to have the form:

$$L'(t) = \text{Re}\left\{\sum_{m=1}^{N_{SP}} R_{i,p_m}\left(-j2\pi\frac{p_m}{T}H_{p_m}X_{i,p_m}e^{j\phi_i}e^{-j2\pi\frac{p_m t}{T}}\right)^*\right\}$$

$$= \frac{2\pi}{T}\text{Re}\left\{j\sum_{m=1}^{N_{SP}} p_m R_{i,p_m}\left(H_{p_m}X_{i,p_m}e^{j\phi_i}e^{-j2\pi\frac{p_m t}{T}}\right)^*\right\}$$

$$= -\frac{2\pi}{T}\text{Im}\left\{\sum_{m=1}^{N_{SP}} p_m R_{i,p_m}\left(H_{p_m}X_{i,p_m}e^{j\phi_i}e^{-j2\pi\frac{p_m t}{T}}\right)^*\right\}$$

Although it is hard to find the close form solution to the equation L'(t)=0, there are many numerical methods suitable for finding an approximation to the solution. For example, Newton's method is an efficient iterative method for estimating solutions to equations. Using Newton's method, an approximate solution $t_{n+1}$ to the equation L'(t)=0 can be obtained from a previous estimate $t_n$ as follows:

$$t_{n+1} = t_n - \frac{L'(t_n)}{L''(t_n)} \quad (2)$$

where the second derivative of L(t) is given by:

$$L''(t) = -\frac{2\pi}{T}\text{Im}\left\{\sum_{m=1}^{N_{SP}} p_m R_{i,p_m}\left(-j2\pi\frac{p_m}{T}H_{p_m}X_{i,p_m}e^{j\phi_i}e^{-j2\pi\frac{p_m t}{T}}\right)^*\right\}$$

$$= -\left(\frac{2\pi}{T}\right)^2 \text{Im}\left\{j\sum_{m=1}^{N_{SP}} p_m^2 R_{i,p_m}\left(H_{p_m}X_{i,p_m}e^{j\phi_i}e^{-j2\pi\frac{p_m t}{T}}\right)^*\right\}$$

$$= -\left(\frac{2\pi}{T}\right)^2 \text{Re}\left\{\sum_{m=1}^{N_{SP}} p_m^2 R_{i,p_m}\left(H_{p_m}X_{i,p_m}e^{j\phi_i}e^{-j2\pi\frac{p_m t}{T}}\right)^*\right\}$$

Note that the second derivative L''(t) is in the denominator of equation (3). This may lead to strong noise enhancement at low SNR. To mitigate the noise effect, the major noise source in L''(t) namely $R_{i,p_m}$ should be addressed. From equation (1), $R_{i,p_m}$ can be approximated by dropping the noise term $N_{i,k}$:

$$R_{i,p_m} \approx H_{p_m}X_{i,p_m}e^{j\phi_i}e^{-j2\pi\frac{p_m \Delta t_i}{T}}$$

Substitution this approximation into L''(t) yields:

$$L''(t) \approx -\left(\frac{2\pi}{T}\right)^2 \text{Re}\left\{\sum_{m=1}^{N_{SP}} p_m^2 |H_{p_m}X_{i,p_m}|^2\right\}$$

-continued $$= -\left(\frac{2\pi}{T}\right)^2 \sum_{m=1}^{N_{SP}} p_m^2 |H_{p_m}X_{i,p_m}|^2$$

Due to $|X_{i,p_m}|^2=1$, the second derivative L''(t) can be further reduced to:

$$L''(t) = -\left(\frac{2\pi}{T}\right)^2 \sum_{m=1}^{N_{SP}} p_m^2 |H_{p_m}|^2$$

Here equation (2) is normalized by a sampling period of $T_s=T/N$:

$$\frac{t_{n+1}}{T_s} = \frac{t_n}{T_s} - \frac{1}{T_s}\frac{L'(t_n)}{L''(t_n)}$$

This can be rewritten as:

$$\tau_{E,i} = \tau_{P,i} - \frac{1}{T_s}\frac{L'(\tau_{P,i}T_s)}{L''(\tau_{P,i}T_s)} \quad (3)$$

where
$\tau_{E,i}$ is a measure of timing offset of the ith symbol, and
$\tau_{P,i}$ is a timing offset prediction value of the ith symbol.

According to the invention, a second-order tracking loop is employed to follow the transmitter's behavior during the lock transient and continuously track the timing of OFDM signals. The tracking loop is modeled with a set of recursive equations by:

$$\tau_{T,i} = \tau_{P,i} + \mu_{\tau,i}\tau_{e,i}$$

$$\nu_{T,i} = \nu_{T,i-1} + \mu_{\nu,i}\tau_{e,i} \quad (4)$$

and $$\tau_{P,i+1} = \tau_{T,i} + \nu_{T,i} \quad (5)$$

where
$\tau_{T,i}$ and $\nu_{T,i}$ denote timing and period offset tracking values of the ith symbol, respectively,
$\mu_{\tau,i}$ and $\mu_{\nu,i}$ denote loop parameters of the ith symbol for $\tau_{T,i}$ and $\nu_{T,i}$, respectively,
$\tau_{P,i+1}$ is the timing offset prediction value of symbol i+1,
$\nu_{T,i-1}$ is the period offset tracking value of symbol i-1,
and $\tau_{e,i}$, a timing error value of the ith symbol, is given by:

$$\tau_{e,i} = \tau_{E,i} - \tau_{P,i}$$

Note that variables or parameters with subscript i refer to the current symbol and those subscripted with i+1 refer to the next symbol. On the other hand, variables or parameters with subscript i−1 indicate that they are associated with the preceding symbol. The index of i=0 represents the first symbol to be tracked in the tracking loop, which is the SIGNAL symbol in IEEE 802.11a. Initial values of recursive equations (4) and (5) are indexed with i=−1. According to the invention, the initial values are given by:

$$\tau_{T,-1} = 0$$

$$v_{T,-1} = -N' \cdot \frac{\hat{f}_d}{f_c}$$

and $$\tau_{P,0} = \tau_{T,-1} + v_{T,-1} = v_{T,-1}$$

where $\hat{f}_d$ is an estimate of frequency offset, $f_c$ is the nominal carrier frequency, and $N'=T'/T_s$. Furthermore, the tracking of period offset should skip the first symbol. Thus, $\mu_{v,0}=0$.

The phase shift caused by timing offset $\Delta t_i$ can be compensated for by means of multiplying the FFT output of the ith symbol, $R_{i,k}$, by a compensation factor of $$e^{j2\pi \frac{k\tau_{P,i}}{N}}.$$

Let $\tau_i = \Delta t_i / T_s$; timing offset $\Delta t_i$ in equation (1) is now normalized to the sample in respect of the receiver's FFT window. If $\tau_i$ exceeds one sample, FFT window alignment will be required. According to invention, the shift amount for the FFT window alignment is given by:

$$\Delta_{d,i+1} = \begin{cases} +1, & \text{if } \tau_{P,i+1} > \Gamma_\kappa \\ -1, & \text{if } \tau_{P,i+1} < \Gamma_\lambda \\ 0, & \text{otherwise} \end{cases}$$

where $\Gamma_\kappa$ and $\Gamma_\lambda$ are thresholds for decision. The shift amount of $\Delta_{d,i+1}=+1$ means that the FFT window should be delayed by one sample in time, while $\Delta_{d,i+1}=-1$ means that the FFT window should be advanced by one sample. To address the unsteady timing shifts, a hysteresis range is introduced to the above criterion. Therefore, $$\Gamma_\kappa - \Gamma_\lambda = 1 + \Gamma_H$$

where $\Gamma_H$ namely the hysteresis range is a positive real number. In addition, it is necessary to deal with feedback delay from the timing offset tracking to the FFT window alignment. FIG. 1 illustrates a way to handle this issue. Briefly, $\Delta_{d,i+1}$ is applied to align the FFT window for the next symbol and an inhibit interval will be started if $\Delta_{d,i+1}$ is not equal to zero. Upon completion of the inhibit interval, $\Delta_{d,i+1}$ is provided for further subtraction from $\tau_{P,i+1}$. In order to prevent the FFT window from additional adjustments, however, $\Delta_{d,i+1}$ is set to 0 during the inhibit interval. It should be contemplated now how to estimate timing error value $\tau_{\epsilon,i}$ for the ith symbol. On the basis of equation (3), $\tau_{\epsilon,i}$ can be calculated from $$\tau_{\epsilon,i} = \tau_{E,i} - \tau_{P,i} = -\frac{1}{T_s} \frac{L'(\tau_{P,i}T_s)}{L''(\tau_{P,i}T_s)} \qquad (6)$$

$$= -\frac{1}{T_s} \frac{-\frac{2\pi}{T} \text{Im}\left\{\sum_{m=1}^{N_{SP}} p_m R_{i,p_m}\left(H_{p_m} X_{i,p_m} e^{j\phi_i} e^{-j2\pi\frac{p_m \tau_{P,i}}{N}}\right)^*\right\}}{-\left(\frac{2\pi}{T}\right)^2 \sum_{m=1}^{N_{SP}} p_m^2 |H_{p_m}|^2}$$

-continued $$= -\frac{N}{2\pi} \frac{\text{Im}\left\{e^{-j\phi_i} \sum_{m=1}^{N_{SP}} p_m R'_{i,p_m}(H_{p_m} X_{i,p_m})^*\right\}}{\sum_{m=1}^{N_{SP}} p_m^2 |H_{p_m}|^2}$$

where $R'_{i,p_m}$, a timing compensated version of the ith received OFDM symbol on pilot subcarrier location $p_m$, given by:

$$R'_{i,p_m} = R_{i,p_m} e^{j2\pi \frac{p_m \tau_{P,i}}{N}} \qquad (7)$$

While the FFT is mentioned in the above discussion, it should be clear to those skilled in the art that the Discrete Fourier Transform (DFT) is also applicable to the present invention since the FFT is an efficient scheme for computing the DFT. Therefore, DFT and FFT are herein interchangeable terms according to the principles of the invention.

Figure 2:
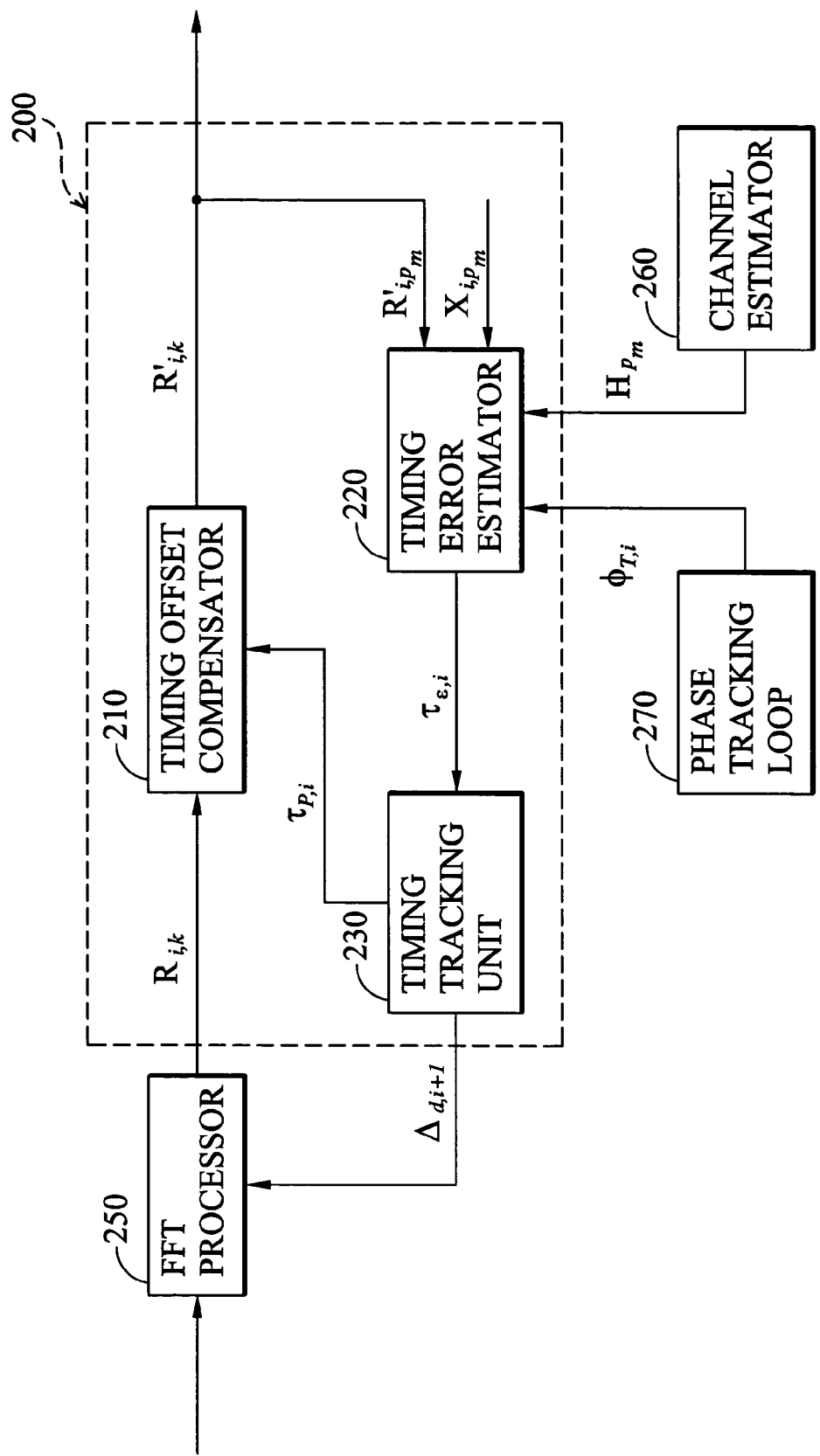
FIG. 2 is a block diagram of a preferred embodiment according to the invention.

In light of the foregoing description, the present invention will now be explained from an embodiment of FIG. 2. As depicted, an FFT (DFT) processor 250 accepts a baseband signal at its input and applies an N-point FFT (DFT) to transform the baseband signal from the time domain to the frequency domain. The FFT (DFT) output $R_{i,k}$ is then fed to a timing offset compensation apparatus of the invention. The timing offset compensation apparatus 200 includes a timing offset compensator 210, a timing error estimator 220 and a timing tracking unit 230. The timing offset compensator 210 receives a current symbol, $R_{i,k}$, from the FFT (DFT) processor 250 and compensates $R_{i,k}$ for the effect of timing offset with a timing offset prediction value, $\tau_{P,i}$. After that, the timing error estimator 220 takes $R'_{i,p_m}$, a timing compensated version of the current symbol on pilot subcarrier locations $p_m$ where $m=1, \ldots, N_{SP}$. In addition, the timing error estimator 220 also takes known data $X_{i,p_m}$ that are transmitted on pilot subcarriers of the current symbol. A channel estimator 260 is used to estimate the channel response of each subcarrier, $H_k$. The channel response of pilot subcarriers, $H_{p_m}$ and $m=1, \ldots, N_{SP}$, is then provided to the timing error estimator 220. Moreover, a phase tracking loop 270 is configured to generate a phase tracking value, $\phi_{T,i}$, for the current symbol. When generated, $\phi_{T,i}$ is fed to the timing error estimator 220. As a result, the timing error estimator 220 calculates a timing error value $\tau_{\epsilon,i}$ for the current symbol with equation (6) in which $\phi_i$ is replaced by $\phi_{T,i}$ so equation (6) becomes a function of $\phi_{T,i}$, $H_{p_m}$, $X_{i,p_m}$, and $R'_{i,p_m}$.

Figure 3:
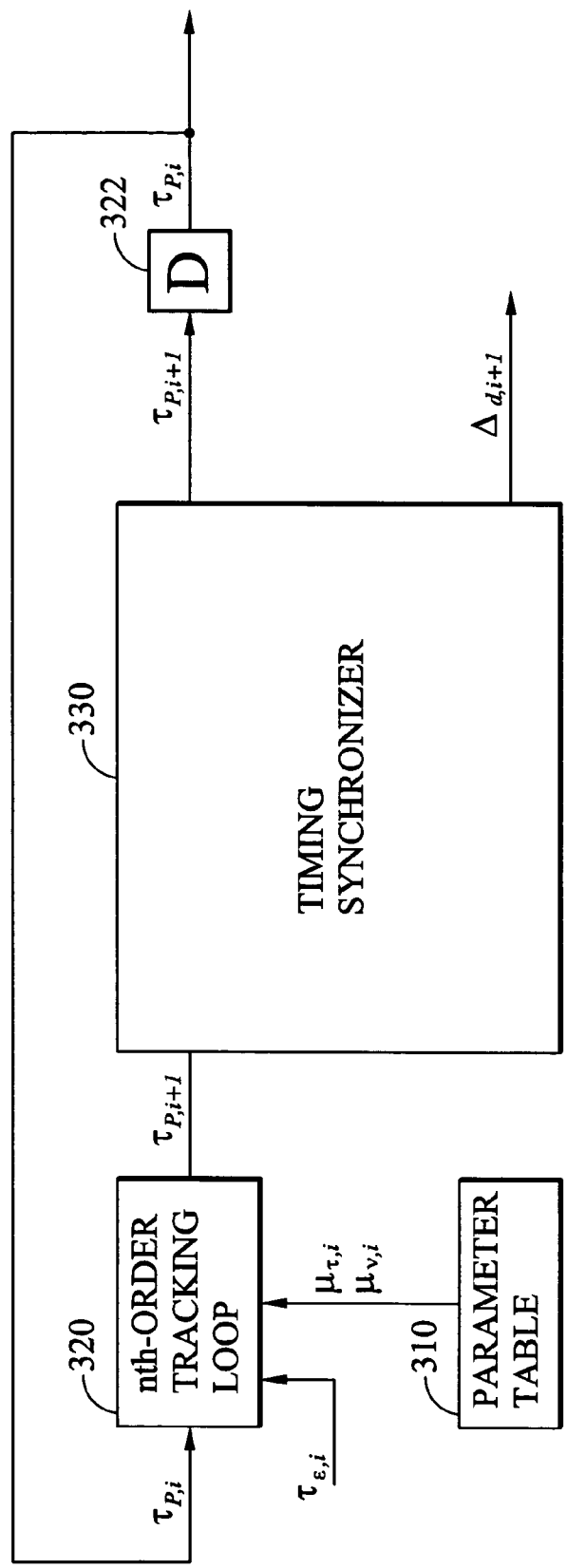
FIG. 3 is a detailed block diagram of a timing tracking unit according to the invention.

The timing tracking unit 230 is designed to generate the timing offset prediction value $\tau_{P,i+1}$ and a shift amount of the FFT (DFT) window, $\Delta_{d,i+1}$, for a next symbol based on a frequency offset estimate $\omega_d$ from outside and the timing error value $\tau_{\epsilon,i}$. Referring to FIG. 3, a block diagram of the timing tracking unit 230 is illustrated. The timing tracking unit 230 is constituted by a parameter table 310, an nth-order tracking loop 320 and a timing synchronizer 330. The parameter table 310 is configured to store a number of loop parameters. The nth-order tracking loop 320 generates the timing offset prediction value $\tau_{P,i+1}$ for the next symbol based on the timing error value $\tau_{\epsilon,i}$, a prior timing offset prediction value $\tau_{P,i}$ and the loop parameters $\mu_{\tau,i}$ and $\mu_{v,i}$ that are retrieved from the parameter table 310 for the current symbol. The nth-order tracking loop 320 internally computes a timing offset tracking value $\tau_{T,i}$ and a period offset tracking value $v_{T,i}$ for the current symbol based on $\tau_{P,i}$, $\tau_{\epsilon,i}$, $\mu_{\tau,i}$ and $\mu_{v,i}$, and yields $\tau_{P,i+1}$ by summing $\tau_{T,i}$ and $v_{T,i}$. In one embodiment, the nth-order tracking loop 320 is a second-order tracking loop modeled with the above-described equations (4) and (5).

Turning now to FIG. 1 where substantial execution steps of the timing synchronizer 330 are illustrated. In step S101, DELAY_CNT is checked to see whether it is equal to zero, in which DELAY_CNT is used to do a countdown of an inhibit interval. If DELAY_CNT is zero (which means the inhibit interval is not activated), then the process proceeds to step S103 where the timing synchronizer 330 generates the FFT (DFT) window shift amount $\Delta_{d,i+1}$ for the next symbol according to $\tau_{P,i+1}$. In the meantime, the timing synchronizer 330 keeps $\Delta_{d,i+1}$ in $\delta_{shift}$. Note that $\Delta_{d,i+1}$ is set to zero if $\tau_{P,i+1}$ derived from the tracking loop 320 is within a predetermined range between $\Gamma_\kappa$ and $\Gamma_\lambda$. In step S105, $\delta_{shift}$, namely $\Delta_{d,i+1}$, is checked to determine whether it is not equal to zero. If so, the process proceeds to step 107 where the timing synchronizer 330 starts the inhibit interval and sets DELAY_CNT to a predetermined value of TIMING_FB_DLY. Otherwise, the process proceeds to step 111 where DELAY_CNT is checked to see whether it is equal to one. In step S115, $\tau_{P,i+1}$ is directly provided as output if DELAY_CNT is not equal to one. On the other hand, $\delta_{shift}$ is subtracted from $\tau_{P,i+1}$ in step S113 if DELAY_CNT is equal to one. Subsequently, $\delta_{shift}$ is reset to zero. In step S117, DELAY_CNT is checked to see whether it is greater than zero. If so, DELAY_CNT is decreased by one; otherwise, the process proceeds back to step S101 for a new symbol. When DELAY_CNT is not zero, $\Delta_{d,i+1}$ is set to zero and the process proceeds to step S111. As such, the FFT (DFT) window is prevented from further adjustments during the inhibit interval. In summary, the timing synchronizer 330 applies $\Delta_{d,i+1}$ to align the FFT (DFT) window for the next symbol and further starts the inhibit interval if $\Delta_{d,i+1}$ is not equal to zero. Additionally, $\delta_{shift}$ (the effective FFT/DFT window shift amount) is subtracted from $\tau_{P,i+1}$ immediately upon completion of the inhibit interval.

Referring again to FIG. 3, the timing tracking unit 230 further comprises a D flip-flop 322 that receives $\tau_{P,i+1}$ from the timing synchronizer 330 and provides as output the timing offset prediction value, $\tau_{P,i}$, for the current symbol. As a result, the timing offset compensator 210 can compensate the current symbol using $\tau_{P,i}$ and provides as output a timing compensated version of the current symbol, $R'_{i,k}$. In this way, the apparatus of the invention really addresses the timing offset in the lock transient of local oscillators. Accordingly, the present invention provides a robust scheme to rapidly acquire and continuously track the timing of OFDM signals.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A timing error estimation apparatus for multi-carrier systems, comprising:

a timing offset compensator for receiving a current symbol in a frequency domain after taking an N-point Discrete Fourier Transform (DFT) and compensating said current symbol for an effect of timing offset with a timing offset prediction value; and a timing error estimator coupled to said timing offset compensator to take a timing compensated version of said current symbol on pilot subcarrier locations, for calculating a timing error value based on a function of a phase tracking value, a channel response of each pilot subcarrier, transmitted data on each pilot subcarrier, and said timing compensated version of said current symbol on said pilot subcarrier locations.

2. The apparatus as recited in claim 1 wherein said timing error value of said current symbol, $\tau_{\epsilon,i}$, is defined by:

$$\tau_{\epsilon,i} = \tau_{E,i} - \tau_{P,i}$$

where subscript i denotes a symbol index, $\tau_{E,i}$ is a measure of timing offset of symbol i, $\tau_{P,i}$ is said timing offset prediction value of symbol i, and $\tau_{\epsilon,i}$ represents said timing error value of symbol i.

3. The apparatus as recited in claim 1 wherein said timing error estimator calculates said timing error value by the following function:

$$\tau_{\varepsilon,i} = -\frac{N}{2\pi} \frac{\operatorname{Im}\left\{ e^{-j\phi_{T,i}} \sum_{m=1}^{N_{SP}} p_m R'_{i,p_m} (H_{p_m} X_{i,p_m})^* \right\}}{\sum_{m=1}^{N_{SP}} p_m^2 |H_{p_m}|^2}$$

where superscript * denotes complex conjugation, $\operatorname{Im}\{\cdot\}$ denotes the imaginary part of a complex number, $\phi_{T,i}$ denotes said phase tracking value of symbol i, $N_{SP}$ is the number of said pilot subcarriers, $p_m$ denotes a pilot subcarrier index, for $m=1, 2, \ldots, N_{SP}$, $H_{p_m}$ denotes said channel responses of pilot subcarrier $p_m$, $X_{i,p_m}$ denotes said transmitted data on pilot subcarrier $p_m$ of symbol i, $R'_{i,p_m}$ denotes said timing compensated version of the ith symbol on pilot subcarrier location $p_m$, and $\tau_{\epsilon,i}$ denotes said timing error value of symbol i.

4. The apparatus as recited in claim 1 wherein said timing offset compensator is employed to compensate the ith symbol on pilot subcarrier location $p_m$ using said timing offset prediction value of the ith symbol and provides as output said timing compensated version of the ith symbol on pilot subcarrier location $p_m$.

5. A timing tracking apparatus for multi-carrier systems, comprising:

a parameter table for storing a plurality of loop parameters;

an nth-order tracking loop for computing a timing offset prediction value for a next symbol based on a timing error value of a current symbol, a timing offset prediction value of said current symbol and said loop parameters, which are retrieved from said parameter table for said current symbol; and a timing synchronizer for generating a shift amount of a DFT window for said next symbol according to said timing offset prediction value of said next symbol, in which said DFT window shift amount is equal to zero if said timing offset prediction value of said next symbol is within a predetermined range;

wherein said timing synchronizer applies said DFT window shift amount to align the DFT window and further starts an inhibit interval if said shift amount is not equal to zero, and provides said DFT window shift amount for further subtraction from said timing offset prediction value of said next symbol upon completion of said inhibit interval.

6. The apparatus as recited in claim 5 wherein said timing synchronizer sets said DFT window shift amount to zero for said next symbol during said inhibit interval, except upon the start of said inhibit interval.

7. The apparatus as recited in claim 5 wherein said nth-order tracking loop computes a timing offset tracking value and a period offset tracking value for said current symbol based on said loop parameters regarding said current symbol, a period offset tracking value of a preceding symbol, said timing offset prediction and said timing error values of said current symbol, and yields said timing offset prediction value for said next symbol by summing said timing offset and said period offset tracking values of said current symbol.

8. The apparatus as recited in claim 5 wherein said nth-order tracking loop is a second-order tracking loop modeled with a set of recursive equations, as follows:

$$\tau_{T,i} = \tau_{P,i} + \mu_{\tau,i}\tau_{\epsilon,i}$$

$$v_{T,i} = v_{T,i-1} + \mu_{v,i}\tau_{\epsilon,i}$$

and $$\tau_{P,i+1} = \tau_{T,i} + v_{T,i}$$

where
  subscript i denotes a symbol index,
  $\tau_{T,i}$ and $v_{T,i}$ denote a timing and period offset tracking value of symbol i, respectively,
  $\mu_{\tau,i}$ and $\mu_{v,i}$ denote said loop parameters of the ith symbol for $\tau_{T,i}$ and $v_{T,i}$, respectively,
  $\tau_{P,i}$ denotes said timing offset prediction value of the ith symbol,
  $\tau_{P,i+1}$ is said timing offset prediction value of symbol i+1,
  $v_{T,i-1}$ is said period offset tracking value of symbol i-1, and $\tau_{\epsilon,i}$, said timing error value of the ith symbol, is given by:

$$\tau_{\epsilon,i} = \tau_{E,i} - \tau_{P,i}$$

where $\tau_{E,i}$ is a measure of timing offset of the ith symbol.

9. The apparatus as recited in claim 8 wherein said second-order tracking loop receives as input a frequency offset estimate and calculates an initial value for said period offset tracking value as follows:

$$v_{T,i} = -N' \cdot \frac{\hat{f}_d}{f_c}, \quad i = -1$$

and $$N' = \frac{T'}{T_s}$$

where
  $\hat{f}_d$ denotes said frequency offset estimate,
  $f_c$ denotes a nominal carrier frequency,
  T' denotes a symbol interval,
  $T_s$ denotes a sampling period,
  $v_{T,i}$ denotes said period offset tracking value of symbol i, and
  $v_{T,-1}$ denotes said initial value for $v_{T,i}$.

10. A timing offset compensation apparatus for multi-carrier systems, comprising:
  a timing offset compensator for receiving a current symbol in a frequency domain after taking an N-point Discrete Fourier Transform (DFT) and compensating said current symbol for an effect of timing offset with a timing offset prediction value;
  a timing error estimator for taking a timing compensated version of said current symbol on pilot subcarrier locations and calculating a timing error value for said current symbol based on a function of a phase tracking value, a channel response of each pilot subcarrier, transmitted data on each pilot subcarrier, and said timing compensated version of said current symbol on said pilot subcarrier locations; and
  a timing tracking unit for receiving said timing error value of said current symbol to generate said timing offset prediction value and a shift amount of a DFT window for a next symbol.

11. The apparatus as recited in claim 10 wherein said timing error value of said current symbol, $\tau_{\epsilon,i}$, is defined by:

$$\tau_{\epsilon,i} = \tau_{E,i} - \tau_{P,i}$$

where
  subscript i denotes a symbol index,
  $\tau_{E,i}$ is a measure of timing offset of symbol i,
  $\tau_{P,i}$ is said timing offset prediction value of symbol i, and
  $\tau_{\epsilon,i}$ represents said timing error value of symbol i.

12. The apparatus as recited in claim 10 wherein said timing error estimator calculates said timing error value by the following function:

$$\tau_{\epsilon,i} = -\frac{N}{2\pi} \cdot \frac{\text{Im}\left\{ e^{-j\phi_{T,i}} \sum_{m=1}^{N_{SP}} p_m R'_{i,p_m} (H_{p_m} X_{i,p_m})^* \right\}}{\sum_{m=1}^{N_{SP}} p_m^2 |H_{p_m}|^2}$$

where
  superscript * denotes complex conjugation,
  Im{·} denotes the imaginary part of a complex number,
  $\phi_{T,i}$ denotes said phase tracking value of symbol i,
  $N_{SP}$ is the number of said pilot subcarriers,
  $p_m$ denotes a pilot subcarrier index, for m=1, 2, ..., $N_{SP}$,
  $H_{p_m}$ denotes said channel responses of pilot subcarrier $p_m$,
  $X_{i,p_m}$ denotes said transmitted data on pilot subcarrier $p_m$ of symbol i,
  $R'_{i,p_m}$ denotes said timing compensated version of the ith symbol on pilot subcarrier location $p_m$, and
  $\tau_{\epsilon,i}$ denotes said timing error value of symbol i.

13. The apparatus as recited in claim 10 wherein said timing offset compensator is employed to compensate the ith symbol using said timing offset prediction value of the ith symbol and provides as output said timing compensated version of the ith symbol, $R'_{i,k}$, where subscript k denotes a subcarrier index.

14. The apparatus as recited in claim 10 wherein said timing tracking unit comprises an nth-order tracking loop to generate said timing offset prediction value for said next symbol by computing a timing offset tracking value and a period offset tracking value of said current symbol.

15. The apparatus as recited in claim 14 wherein said timing tracking unit further comprises a timing synchronizer to receive said timing offset prediction value of said next symbol from said nth-order tracking loop, generate said DFT window shift amount for said next symbol, and further start an inhibit interval if said shift amount is not equal to zero, in which said DFT window shift amount is applied to align the DFT window and is provided for further subtraction from said timing offset prediction value upon completion of said inhibit interval.

16. The apparatus as recited in claim 10 wherein said timing tracking unit comprises:
a parameter table for storing a plurality of loop parameters;
an nth-order tracking loop for computing said timing offset prediction value for said next symbol based on said timing error value of said current symbol, said timing offset prediction value of said current symbol and said loop parameters that are retrieved from said parameter table for said current symbol; and
a timing synchronizer for generating said DFT window shift amount for said next symbol according to said timing offset prediction value of said next symbol, in which said DFT window shift amount is equal to zero if said timing offset prediction value of said next symbol is within a predetermined range;
wherein said timing synchronizer applies said DFT window shift amount to align the DFT window and further starts an inhibit interval if said shift amount is not equal to zero, and provides said DFT window shift amount for further subtraction from said timing offset prediction value upon completion of said inhibit interval.

17. The apparatus as recited in claim 16 wherein said timing synchronizer sets said DFT window shift amount to zero for said next symbol during said inhibit interval, except upon the start of said inhibit interval.

18. The apparatus as recited in claim 16 wherein said nth-order tracking loop is a second-order tracking loop modeled with a set of recursive equations, as follows:

$$\tau_{T,i} = \tau_{P,i} + \mu_{\tau,i}\tau_{e,i}$$

$$v_{T,i} = v_{T,i-1} + \mu_{v,i}\tau_{e,i}$$

and $$\tau_{P,i+1} = \tau_{T,i} + v_{T,i}$$

where
subscript i denotes a symbol index,
$\tau_{T,i}$ and $v_{T,i}$ denote a timing and period offset tracking value of symbol i, respectively,
$\mu_{\tau,i}$ and $\mu_{v,i}$ denote said loop parameters of the ith symbol for $\tau_{T,i}$ and $v_{T,i}$, respectively,
$\tau_{P,i}$ denotes said timing offset prediction value of the ith symbol,
$\tau_{P,i+1}$ is said timing offset prediction value of symbol i+1,
$v_{T,i-1}$ is said period offset tracking value of symbol i−1,
and $\tau_{e,i}$, said timing error value of the ith symbol, is given by:

$$\tau_{e,i} = \tau_{E,i} - \tau_{P,i}$$

where $\tau_{E,i}$ is a measure of timing offset of the ith symbol.

19. The apparatus as recited in claim 18 wherein said second-order tracking loop receives as input a frequency offset estimate and calculates an initial value for said period offset tracking value as follows:

$$v_{T,i} = -N' \cdot \frac{\hat{f}_d}{f_c}, i = -1$$

and $$N' = \frac{T'}{T_s}$$

where
$\hat{f}_d$ denotes said frequency offset estimate,
$f_c$ denotes a nominal carrier frequency,
T' denotes a symbol interval,
$T_s$ denotes a sampling period,
$v_{T,i}$ denotes said period offset tracking value of symbol i, and
$v_{T,-1}$ denotes said initial value for $v_{T,i}$.

20. The apparatus as recited in claim 16 wherein said timing tracking unit further comprises a flip-flop that receives as input said timing offset prediction value of said next symbol and provides as output said timing offset prediction value for said current symbol.

* * * * *